United States Patent
Ha et al.

(10) Patent No.: US 7,493,148 B2
(45) Date of Patent: Feb. 17, 2009

(54) BATTERY CHARGING DEVICE FOR A MOBILE APPARATUS USING AN EAR-MICROPHONE JACK

(75) Inventors: Min-Woong Ha, Yongin-si (KR); In-Ki Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 10/915,941

(22) Filed: Aug. 6, 2004

(65) Prior Publication Data
US 2005/0077870 A1     Apr. 14, 2005

(30) Foreign Application Priority Data
Aug. 7, 2003     (KR)     ............ 10-2003-0054679

(51) Int. Cl.
*H04B 1/38*     (2006.01)
*H04M 1/00*     (2006.01)

(52) U.S. Cl. ............ 455/573; 455/572; 455/343.1; 455/550.1

(58) Field of Classification Search ............ 455/573, 455/343.1, 574, 572, 550.1, 343.2, 343.5–6, 455/90.1–2, 90.3, 343.3, 67.11, 552.1; 320/114, 320/150, 106, 162
See application file for complete search history.

(56) References Cited

U.S. PATENT DOCUMENTS

| | | | |
|---|---|---|---|
| 6,329,787 B1 * | 12/2001 | Ito et al. | 320/114 |
| 6,429,622 B1 * | 8/2002 | Svensson | 320/106 |
| 6,580,929 B1 * | 6/2003 | Chiu | 455/573 |
| 7,023,180 B2 * | 4/2006 | Nagai et al. | 320/162 |
| 2001/0011884 A1 * | 8/2001 | Sakakibara | 320/150 |
| 2002/0130634 A1 * | 9/2002 | Ziemkowski et al. | 320/106 |
| 2004/0185917 A1 * | 9/2004 | Fischedick et al. | 455/574 |

* cited by examiner

*Primary Examiner*—John J Lee
(74) *Attorney, Agent, or Firm*—Roylance, Abrams, Berdo & Goodman, LLP (57) ABSTRACT

A battery charging device using an ear-microphone jack of a mobile apparatus. The battery charging device comprises a battery; an ear-microphone socket having a microphone contact, an earphone contact, and a common ground contact; a modem chip having a microphone input port connected to the microphone contact or an internal microphone and an earphone output port connected to the earphone contact or an internal speaker; and a cutting-off element connected between a power supply contact and the battery, for providing a charging voltage provided via the power supply contact to the battery and preventing a current from flowing backward from the battery to the modem chip. A power supply device comprises a plug having terminals connectable to contacts of the ear-microphone socket; and a power source connector for connecting a power supply source to the plug.

10 Claims, 6 Drawing Sheets

BATTERY CHARGING DEVICE FOR A MOBILE APPARATUS USING AN EAR-MICROPHONE JACK

This application claims the benefit under 35 U.S.C. § 119 (a) of an application entitled "Battery Charging Device for Mobile Apparatus Using Ear-Microphone Jack" filed in the Korean Intellectual Property Office on Aug. 7, 2003 and assigned Serial No. 2003-54679, the entire contents of which are incorporated herein by reference.

BACKGROUND OF THE INVENTION

1. Field of the Invention

The present invention relates generally to the charging of a mobile apparatus. In particular, the present invention relates to a battery charging device using an ear-microphone jack of a mobile apparatus.

2. Description of the Related Art

Mobile communication has become a necessity of present-day life. Accordingly, there is an increase in demand for a mobile apparatus having a call function and various additional functionalities, such as a cellular phone, a Personal Communications Service (PCS) phone, an International Mobile Telecommunication-2000 (IMT-2000) phone, Personal Digital Assistant (PDA), and so on. In addition, various functions for improving a user's convenience of the mobile apparatus are being studied. In particular, because the mobile apparatus supporting mobile communication is always carried by a user, its portability is very important.

To provide portability, mobile apparatuses are being reduced in size. Therefore, research is being conducted on technology for reducing a size of a battery of a mobile apparatus while increasing a storage capacity of the battery. However, because a storage capacity of a battery is limited, there is a demand for a charging device for periodically charging the battery.

Figure 1:
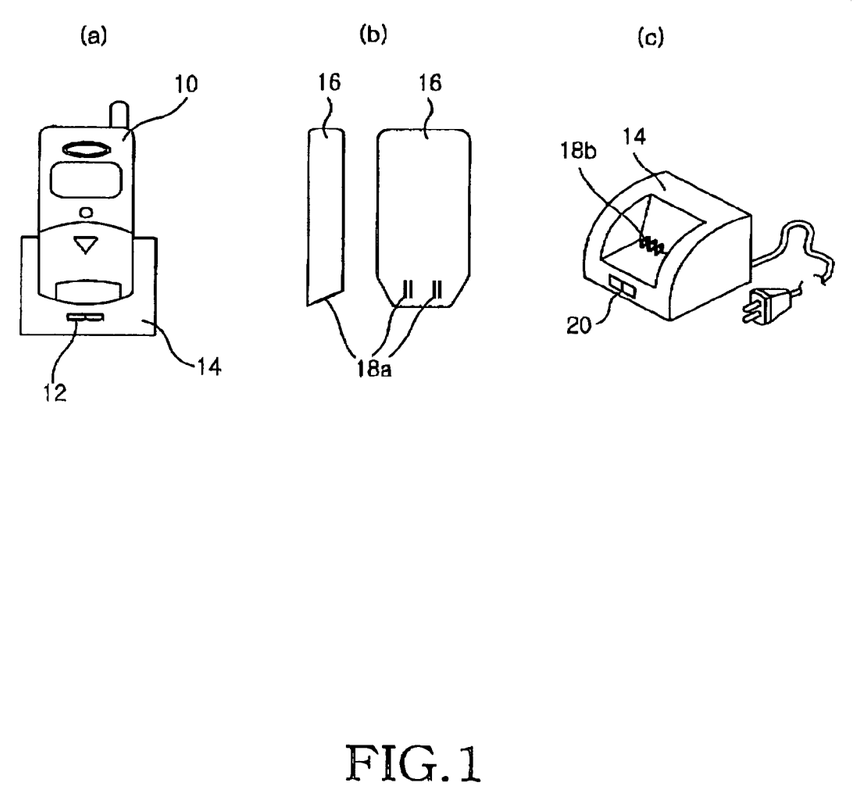
FIGS. 1A through 1C are diagrams illustrating an example of a conventional charging method for a mobile phone.

FIGS. 1A through 1C are diagrams illustrating a an example of a conventional charging method for a mobile phone. As illustrated, a charging device includes a cradle 14 on which a battery 16 or a mobile phone 10 mounted with the battery 16 rests, charging connection terminals 18b connectable to connection terminals 18a on a rear face of the battery 16, and a light emitting diode (LED) 20 for indicating a charging status. The cradle 14 converts Alternating Current (AC) electric power into Direct Current (DC) electric power and provides the DC electric power to the battery 16.

FIGS. 1A to 1C illustrate an example of a conventional charging method using connection terminals of the battery. This charging method is disadvantageous in that different cradles are used according to the model and manufacturer of the mobile phone. Recently, a charging method using a serial or Universal Serial BUS (USB) port mounted on a bottom of a mobile phone for providing data communication with another mobile phone has become popular.

Figure 2:
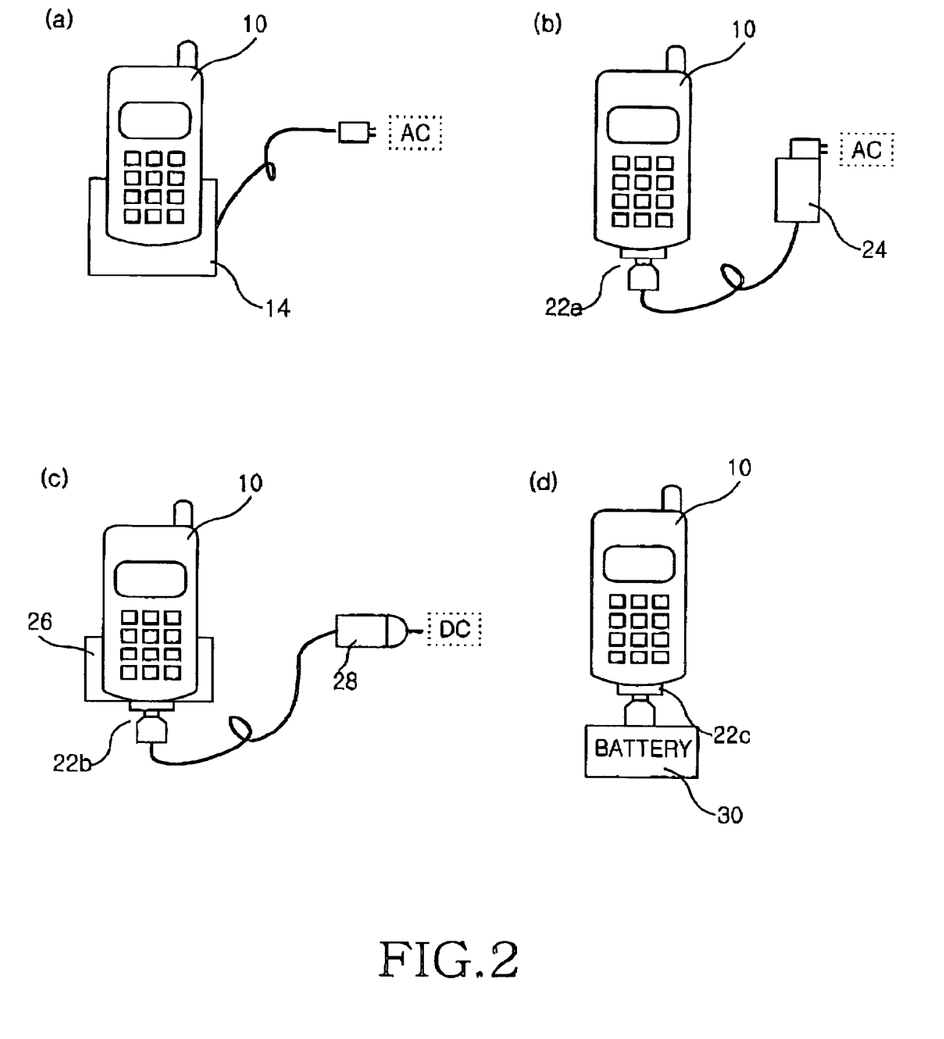
FIGS. 2A through 2D are diagrams illustrating other examples of conventional charging methods for charging a mobile phone.

FIGS. 2A through 2D are diagrams illustrating other examples for charging a mobile phone. FIG. 2A illustrates a charging method using a desk cradle 14, which is identical to the charging method illustrated in FIGS. 1A to 1C. FIGS. 2B through 2D illustrate charging methods using a data communication port of a mobile phone.

FIG. 2B illustrates a charging device for traveling. The charging device includes an adaptor 24 for converting AC electric power into DC electric power, and a connector 22a for connecting the DC electric power to a data communication port of the mobile phone 10. FIG. 2C illustrates a charging device for an automobile. The charging device includes a cradle 26 for the automobile, a connector 28 for connecting to DC electric power of the automobile, and a connector 22b connected to a data communication port of a mobile phone 10. FIG. 2D illustrates a charging device using a common battery. The charging device includes a battery 30 and a connector 22c connected to a data communication port of a mobile phone 10.

However, the charging devices illustrated in FIGS. 2A through 2D are also disadvantageous in that they are large in size, making it inconvenient to carry the mobile phone and increase the cost of manufacturing the phone. In addition, because mobile phones have different data communication specifications according to the model and also have different battery sizes and charging specifications, different charging devices are required.

SUMMARY OF THE INVENTION

It is, therefore, an object of the present invention to provide a small charging device for a mobile apparatus, which is easy to carry and low in cost.

It is another object of the present invention to provide a battery charging device for a mobile apparatus using an ear-microphone jack.

In accordance with one aspect of the present invention, there is provided a battery charging device for a mobile apparatus. The device comprises a battery; an ear-microphone socket having a microphone contact, an earphone contact, and a common ground contact; a modem chip having a microphone input port connected to the microphone contact or an internal microphone and an earphone output port connected to the earphone contact or an internal speaker, the modem chip being driven by a voltage provided from the battery; and a cutting-off element connected between a power supply contact, which is any one of the microphone contact and the earphone contact, and the battery, for providing a charging voltage provided via the power supply contact to the battery and preventing a current from flowing backward from the battery to the modem chip.

In accordance with another aspect of the present invention, there is provided a battery charging device in a power supply device for charging a battery of a mobile apparatus. The device comprises an ear-microphone socket having a microphone contact, an earphone contact, and a common ground contact, and a battery for receiving a charging voltage provided via the ear-microphone socket. The battery charging device comprises a plug having terminals for connecting to contacts of the ear-microphone socket; and a power source connector for connecting a power supply source to the plug.

BRIEF DESCRIPTION OF THE DRAWINGS

The above and other objects, features and advantages of the present invention will become more apparent from the following detailed description when taken in conjunction with the accompanying drawings in which.

Throughout the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings. In the following description, a detailed description of known functions and configurations incorporated herein has been omitted for conciseness.

The present invention provides a charging device having a plug connectable to an earphone-microphone jack (hereinafter referred to as an "ear-microphone jack") in order to charge a mobile apparatus including the ear-microphone jack. Herein, a description of an embodiment of the present invention will be made with reference to a mobile phone, for example, a conventional mobile apparatus having an ear-microphone jack.

Figure 3:
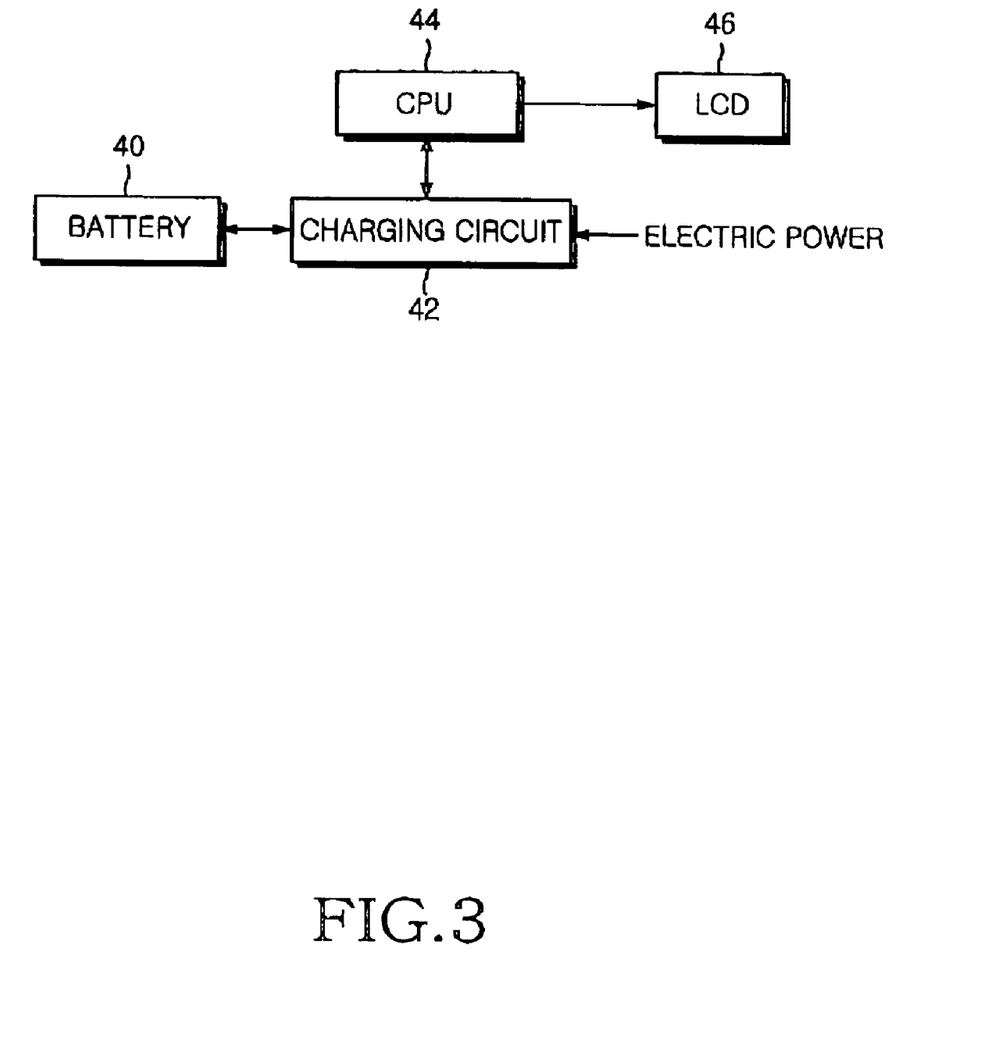
FIG. 3 is a block diagram illustrating an internal structure of a mobile phone employing a charging method according to an embodiment of the present invention.

FIG. 3 is a block diagram illustrating an internal structure of a mobile phone employing a charging method according to an embodiment of the present invention. As illustrated, the mobile phone includes a battery 40 for powering circuits, a charging circuit 42 for charging the battery 40, and a central processing unit (CPU) 44, and a controller for controlling an operation of the charging circuit 42.

If received electric power is input to the mobile phone via the charging circuit 42, the charging circuit 42 transmits a predetermined signal to the controller 44 to indicate a charging mode, and charges the battery 40. During charging, the CPU 44 indicates a charging status of the battery 40 using a liquid crystal display (LCD) 46 based on information received from the charging circuit 42, and if the charging is complete, the controller 44 indicates a full-charge status of the battery 40.

The received electric power is provided from an external power supply via an ear-microphone jack of the mobile phone. The ear-microphone jack comprises a socket having a standard size and form so that it can be connected to an external earphone-microphone set, in order to enable a user to perform a call with his or her hands free.

Figure 4:
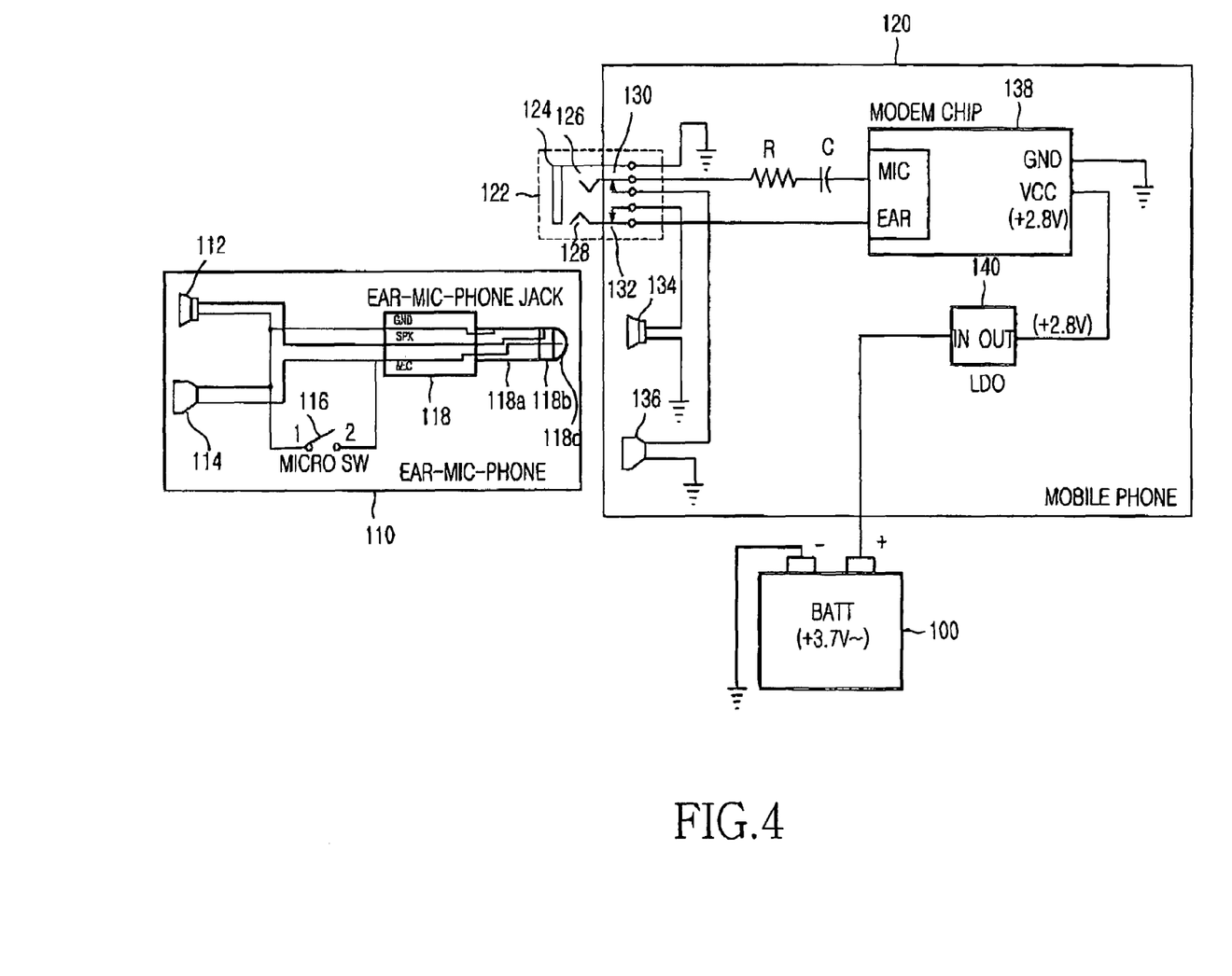
FIG. 4 is a diagram illustrating a connection between a mobile apparatus and a conventional ear-microphone.

FIG. 4 is a diagram illustrating a connection between a mobile apparatus and a conventional ear-microphone. Here, the mobile apparatus includes a mobile phone 120 and a battery 100.

Referring to FIG. 4, the mobile phone 120 includes an ear-microphone socket 122 connected to an internal speaker 134, an internal microphone 136, and a modem chip 138 that preferably operates with a voltage of +2.8V provided from the battery 100 via a Low Drop Out (LDO) regulator 140. An ear-microphone 110 comprises an earphone speaker 112, a microphone 114, a plug 118, and a call switch 116.

The plug 118 includes three terminals 118a, 118b, and 118c. The terminal 118a is used as a common ground, the terminal 118b is connected to the speaker 112, and the terminal 118c is connected to the microphone 114. The ear-microphone socket 122 comprises four contacts 126, 128, 130 and 132, and a circular contact 124 used as a common ground.

When no plug is inserted, the contacts 130 and 132 are physically short-circuited to the contacts 126 and 128, respectively. It is shown herein that arrows of the contacts 130 and 132 make contact with the contacts 126 and 128, respectively.

As a result, a microphone input port MIC of the modem chip 138 is connected to the internal microphone 136 via the contacts 126 and 130, and an earphone output port EAR of the modem chip 138 is connected to the internal speaker 134 via the contacts 128 and 132.

When the plug 118 is inserted into the ear-microphone socket 122, the terminal 118a is connected to the circular contact 124, the terminal 118b is connected to the contact 128, and the terminal 118c is connected to the contact 126. In addition, by the physical force of the plug 118 being inserted, the contacts 130 and 132 are separated from the contacts 126 and 128, respectively, cutting off the connection to the speaker 134 and the microphone 136. As a result, the microphone input port MIC of the modem chip 138 is connected to the microphone 114 via the contact 126 and the terminal 118c, and the earphone output port EAR of the modem chip 138 is connected to the speaker 112 via the contact 128 and the terminal 118b, enabling use of the ear-microphone 110.

Figure 5:
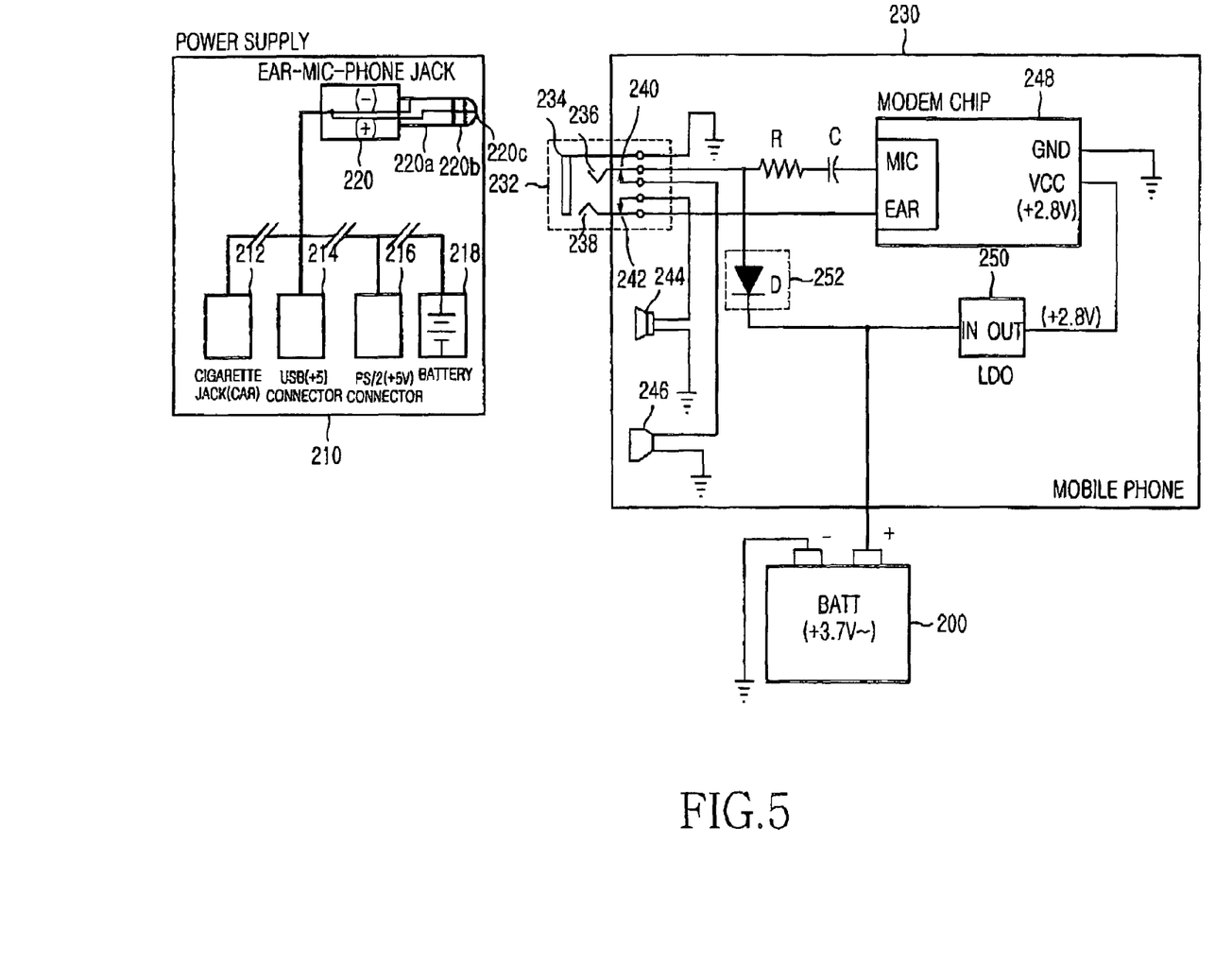
FIG. 5 is a circuit diagram illustrating a battery charging device according to an embodiment of the present invention.

FIG. 5 is a circuit diagram illustrating a battery charging device according to an embodiment of the present invention. Herein, an ear-microphone socket 232 of a mobile phone 230 is connected to a plug 220 of a power supply 210.

Referring to FIG. 5, the mobile phone 230 includes the ear-microphone socket 232 connected to an internal speaker 244, an internal microphone 246, and a modem chip 248 that preferably operates with a voltage of +2.8V provided from a battery 200 via an LDO regulator 250. The power supply 210 comprises the plug 220 and power source contacts 212, 214, 216 and 218.

The power supply 210 comprises a power source connector, such as a USB connector 214 connectable to a USB port of a personal computer (PC), a standard PS/2 connector 216 connectable to a PS/2 port of the personal computer, a cigarette jack 212 for an automobile, or a battery connector 218, and the ear-microphone plug 220 connectable to the ear-microphone socket 232 of the mobile phone 230. Here, the cigarette jack 212 has a function of dropping electric power of +12V for the automobile to +5V.

When no plug is inserted, a microphone input port MIC of the modem chip 248 is connected to the internal microphone 246 via contacts 236 and 240, and an earphone output port EAR of the modem chip 248 is connected to the internal speaker 244 via contacts 238 and 242.

When the plug 220 of the power supply 210 is inserted into the ear-microphone socket 232, a terminal 220a is connected to a circular contact 234, a terminal 220b is connected to the contact 238, and a terminal 220c is connected to the contact 236. In addition, by the physical force of the plug 220 being inserted, the contacts 240 and 242 are separated from the contacts 236 and 238, respectively, cutting off the connection between the modem chip 248 and the speaker 244 and the microphone 246.

As a result, external electric power of +5V provided from an external power supply (e.g., PC, car battery, or dry cell) via the power source connector 212, 214, 216 or 218 is provided to the mobile phone 230 via the terminal 220c of the plug 220 and the contact 236. Because a condenser C for removing an effect of DC electric power is connected between the microphone input port MIC of the modem chip 248 and the ear-microphone socket 232, the external electric power is provided to the modem chip 248 or the battery 200 without affecting other circuits.

A diode (D) 252 inserted between the modem chip 248 and the battery 200 provides a charging voltage to the battery 200, preventing an electric current from flowing backward from the battery 200 to the modem chip 248, and drops a general voltage of +5.2V provided via a USB port or a PS/2 port of a PC to +4.5V by 0.6 to 0.7V (5.2−0.7=4.5).

Figure 6:
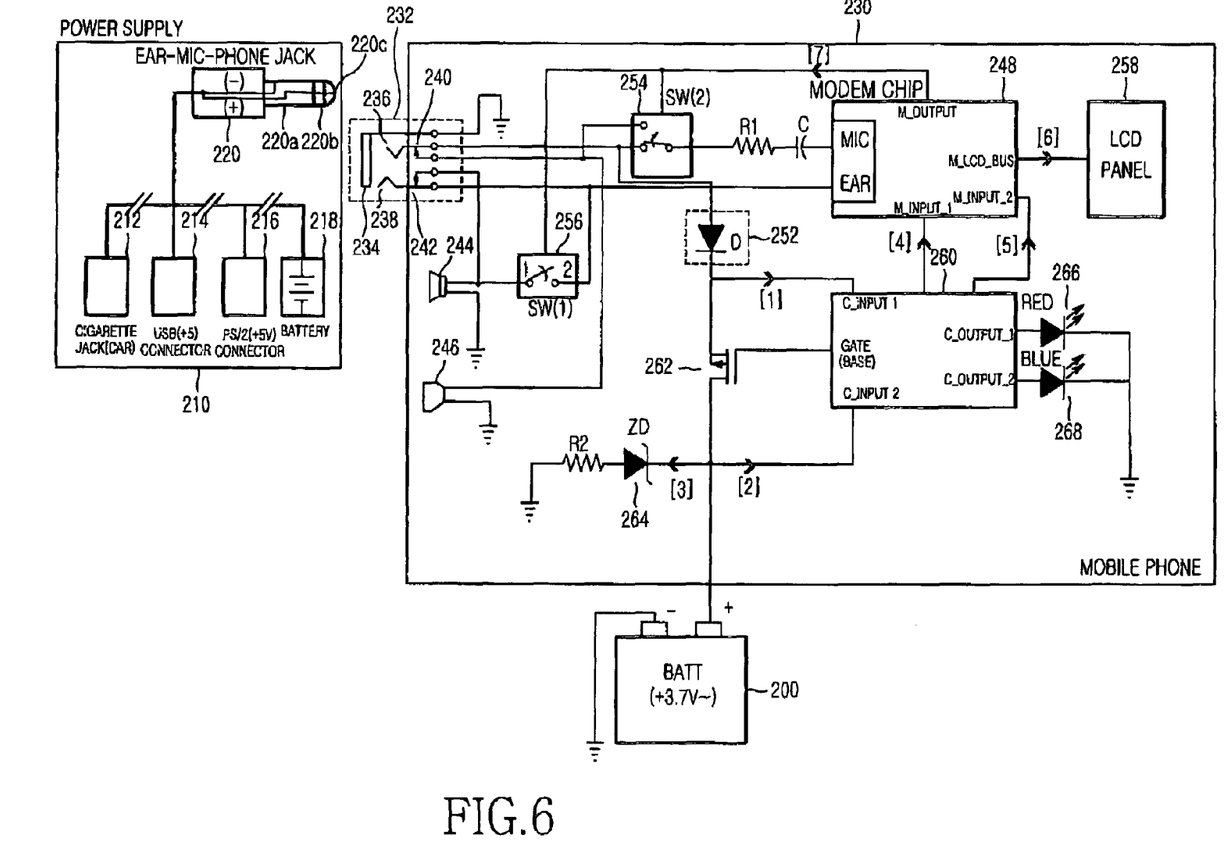
FIG. 6 is a circuit diagram illustrating a detailed structure of a battery charging device according to an embodiment of the present invention.

FIG. 6 is a circuit diagram illustrating a detailed structure of a battery charging device according to an embodiment of the present invention. Herein, a description will be made of an operation of a charging controller 260 that prevents a battery of a mobile phone from being over charged and reports a charging status of the battery to the modem chip 248. A flow of electric power provided from the battery 200 via an LDO regulator 250 as VCC of the modem chip 248 is omitted herein.

Referring to FIG. 6, if the plug 220 of the power supply 210 is inserted into the ear-microphone socket 232, external electric power of +5V provided from an external power supply (e.g., PC, car battery, or dry cell) via the power source connector 212, 214, 216 or 218 is provided to the mobile phone 230 via the terminal 220c of the plug 220 and the contact 236.

The external electric power is voltage-dropped to +4.5V [1] after passing through a diode (D) 252. The charging controller 260 analyzes a voltage [1] at an input port C_INPUT_1 to determine whether a charging electric power or an ear-microphone is connected. If the voltage [1] is higher than or equal to about +4.5V, the charging controller 260 determines that there is a charging electric power. However, if the voltage [1] is lower than +4.5V, the charging controller 260 determines that an ear-microphone is connected. If the charging controller 260 detects that charging electric power is being received, it informs the modem chip 248 of the receipt of the charging electric power using a signal [4] at an output port C_OUTPUT_1.

Thereafter, the charging controller 260 analyzes a voltage [2] at an input port C_INPUT_2 to analyze a voltage of the battery 200, and determines whether to charge the battery 200. If the voltage [2] is approximately lower than 4.1V, the charging controller 260 turns on a gate or base terminal of a P-channel Metal-Oxide Semiconductor Field Effect Transistor (MOSFET) or a PNP-type transistor 262 so that external electric power passing through the diode 252 charges the battery 200.

When a charging voltage of 4.25V or higher is applied, the life of a Lithium-ion battery, a battery typically used for a mobile phone, is reduced because a chemical formula is changed. Therefore, the transistor 262 again voltage-drops the external electric power of +4.5V that passed through the diode 252, thereby preventing the Lithium-ion battery from being abruptly charged with an overvoltage of 4.25V or higher.

The charging controller 260 drives a red LED 266 with a C_OUTPUT_1 signal if charging is started by turning on the transistor 262, and if the charging is complete, the charging controller 260 drives a blue LED 268 with a C_OUTPUT_2 signal. If the modem chip 248 determines with the signal [4] that charging electric power is received, it detects a current charging status using a signal [5] and displays the detected charging status on an LCD panel 258 through a signal [6].

A Zener diode 264 serves as a protection circuit for preventing an overvoltage of +4.25V or higher from being applied to a Lithium-ion battery due to an abrupt change in voltage [2]. That is, if the voltage [2] becomes higher than +4.25V, it is grounded by a register R2 of the Zener diode 264, so the battery 200 is protected from overvoltage.

When no plug is inserted into the ear-microphone socket 232 or a plug of an ear-microphone is inserted into the ear-microphone socket 232, i.e., in a normal case, an analog switch 254 connects a microphone input port MIC of the modem chip 248 to a contact 236 of the ear-microphone socket 232, and an analog switch 256 is opened. After detecting charging through the ear-microphone socket 232 by the signal [4], if there is an incoming call or a user desires to make an outgoing call, the modem chip 248 drives the analog switches 254 and 256 using a signal [7] to directly connect the microphone input port and the earphone output port to the internal microphone 246 and the internal speaker 244 without passing through the ear-microphone socket 232, in order to enable a call through the internal microphone 246 and the internal speaker 244.

As should be understood from the foregoing description, the embodiments of the present invention provide a circuit for charging a battery via an ear-microphone jack in a mobile apparatus having the ear-microphone jack, thereby contributing to a reduction in size and cost of the charging device and an increase in portability of the mobile apparatus.

While the invention has been shown and described with reference to a certain embodiments thereof, it should be understood by those skilled in the art that various changes in form and details may be made therein without departing from the spirit and scope of the invention as defined by the appended claims. For example, although a charging voltage is provided via the contact 236 of the ear-microphone socket 232 in the foregoing embodiment, the plug 220 may provide a charging voltage via the terminal 220b in a modified embodiment of the present invention. In this case, the diode 252 is connected between the contact 238 and the battery 200 to provide the charging voltage to the battery 20, preventing a current from flowing backward from the battery 200 to the modem chip 248.

What is claimed is:

1. A battery charging device for a mobile apparatus, comprising:
    a battery;
    an ear-microphone socket having a microphone contact, an earphone contact, and a common ground contact;
    a modem chip having a microphone input port connected to the microphone contact or an internal microphone and an earphone output port connected to the earphone contact or an internal speaker, the modem chip being driven by a voltage provided from the battery; and
    a cutting-off element connected between a power supply contact, which is any one of the microphone contact and the earphone contact, and the battery, for providing a charging voltage provided via the power supply contact to the battery and preventing a current from flowing backward from the battery to the modem chip.

2. The battery charging device of claim 1, wherein the cutting-off element comprises a diode having an anode connected to the power supply contact and a cathode connected to a positive node of the battery.

3. The battery charging device of claim 1, further comprising:
    a switch element connected between the cutting-off element and the battery; and
    a charging controller for turning on the switch element to provide the charging voltage to the battery via the switch element if a voltage of the battery is lower than or equal to a predetermined level.

4. The battery charging device of claim 3, wherein the switch element is a PNP-type transistor having an emitter connected to the cutting-off element, a collector connected to a positive node of the battery, and a base connected to the charging controller.

5. The battery charging device of claim 3, wherein the switch element is a P-channel Metal-Oxide Semiconductor Field Effect Transistor (MOSFET) having a source connected to the cutting-off element, a drain connected to a positive node of the battery, and a gate connected to the charging controller.

6. The battery charging device of claim 3, wherein the charging controller measures a voltage of the battery after detecting the charging voltage, and indicates a charging status of the battery using at least one light emitting diode (LED).

7. The battery charging device of claim 3, wherein the charging controller measures a voltage of the battery after detecting the charging voltage, and indicates a charging status of the battery on a liquid crystal display (LCD) panel via the modem chip.

8. The battery charging device of claim 1, further comprising a protection element for connecting the charging voltage to a ground in order to prevent overcharge of the battery if a voltage of the battery is higher than a predetermined level.

9. The battery charging device of claim 8, wherein the protection element is a Zener diode having a cathode connected to a positive node of the battery and an anode grounded to earth.

10. The battery charging device of claim 1, further comprising:
a first switch element for connecting the microphone input port of the modem chip to the power supply contact of the ear-microphone socket or the internal microphone; and
a second switch element for connecting the earphone output port of the modem chip to the power supply contact of the ear-microphone socket or the internal speaker;
wherein the first switch element and the second switch element connect the microphone input port and the earphone output port to the internal microphone and the internal speaker, respectively, under the control of the modem chip, when there is an outgoing call or an incoming call during charging via the ear-microphone socket.

* * * * *